United States Patent
Lu et al.

(10) Patent No.: US 10,499,354 B2
(45) Date of Patent: Dec. 3, 2019

(54) SYNCHRONIZATION SIGNAL TRANSMISSION METHOD IN COMMUNICATION SYSTEM, AND SYNCHRONIZATION METHOD AND DEVICE

(71) Applicant: ZTE CORPORATION, Shenzhen, Guangdong Province (CN)

(72) Inventors: Haitao Lu, Shenzhen (CN); Peng Hao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/744,072

(22) PCT Filed: May 30, 2016

(86) PCT No.: PCT/CN2016/083930
§ 371 (c)(1),
(2) Date: Jan. 12, 2018

(87) PCT Pub. No.: WO2017/020643
PCT Pub. Date: Feb. 9, 2017

(65) Prior Publication Data
US 2018/0213494 A1 Jul. 26, 2018

(30) Foreign Application Priority Data
Jul. 31, 2015 (CN) .......................... 2015 1 0464785

(51) Int. Cl.
*H04W 56/00* (2009.01)
*H04L 27/26* (2006.01)
(Continued)

(52) U.S. Cl.
CPC ......... *H04W 56/001* (2013.01); *H04L 5/0053* (2013.01); *H04L 27/2602* (2013.01);
(Continued)

(58) Field of Classification Search
CPC ............... H04W 56/001; H04L 5/0053; H04L 27/2602; H04L 27/2607
See application file for complete search history.

(56) References Cited

U.S. PATENT DOCUMENTS

2004/0190639 A1 * 9/2004 Pauli .................... H04L 1/0618
375/260
2005/0068886 A1 * 3/2005 Wang .................. H04L 27/2607
370/210
(Continued)

FOREIGN PATENT DOCUMENTS

CN 101001234 A 7/2007
CN 101018221 A 8/2007
(Continued)

OTHER PUBLICATIONS

NTT DOCOMO, Views on Radio-Interface Based Synchronization Mechanisms, 3GPP TSG RAN WG1 Meeting #73, Fukuoka, Japan, May 20-24, 2013. R1-132366.
(Continued)

*Primary Examiner* — Gregory B Sefcheck
*Assistant Examiner* — Jael M Ulysse (57) ABSTRACT

The present document discloses a synchronization signal transmission method, synchronization method and device in a communication system. The transmission method includes: generating, by a communication node, a radio frame, the radio frame including N subframes, each subframe including M Orthogonal Frequency Division Multiplexing (OFDM) symbols and P synchronization signals, each OFDM symbol including a first Cyclic Prefix (CP) and an OFDM symbol data portion, herein data signals of the first CP are as same as data signals of a tail of the OFDM symbol data portion at a corresponding length, and N, M and P are positive integers, $0 \leq P \leq M$, and the synchronization signal includes a second CP and a synchronization signal data portion; and transmitting, by the communication node, the radio frame.

15 Claims, 5 Drawing Sheets

(51) Int. Cl.
*H04W 72/04* (2009.01)
*H04L 5/00* (2006.01)

(52) U.S. Cl.
CPC ...... *H04L 27/2607* (2013.01); *H04L 27/2613* (2013.01); *H04L 27/2655* (2013.01); *H04L 27/2656* (2013.01); *H04L 27/2692* (2013.01); *H04W 56/003* (2013.01); *H04W 72/0446* (2013.01)

(56) References Cited

U.S. PATENT DOCUMENTS

| | | | | |
|---|---|---|---|---|
| 2009/0122771 A1* | 5/2009 | Cai | ............ | H04J 11/00 370/338 |
| 2009/0207853 A1* | 8/2009 | Mueller-Weinfurtner | ............ | H04L 27/2647 370/465 |
| 2010/0135257 A1* | 6/2010 | Higuchi | ............ | H04J 11/0076 370/336 |
| 2010/0165942 A1* | 7/2010 | Liao | ............ | H04L 5/005 370/329 |
| 2011/0007730 A1* | 1/2011 | Han | ............ | H04J 11/003 370/342 |
| 2011/0026413 A1* | 2/2011 | Swarts | ............ | H04J 11/0073 370/252 |
| 2011/0243057 A1* | 10/2011 | Shin | ............ | H04B 7/15528 370/315 |
| 2011/0312353 A1* | 12/2011 | Banister | ............ | H04B 7/0691 455/500 |
| 2012/0093076 A1* | 4/2012 | Zhang | ............ | H04J 11/005 370/328 |
| 2012/0275379 A1* | 11/2012 | Swarts | ............ | H04J 11/0069 370/328 |
| 2013/0021954 A1* | 1/2013 | Montojo | ............ | H04L 5/14 370/295 |
| 2013/0155939 A1* | 6/2013 | Lee | ............ | H04B 7/15528 370/315 |
| 2013/0176952 A1* | 7/2013 | Shin | ............ | H04L 5/001 370/329 |
| 2013/0188624 A1* | 7/2013 | Lee | ............ | H04W 24/02 370/338 |
| 2013/0322363 A1* | 12/2013 | Chen | ............ | H04W 72/042 370/329 |
| 2015/0029886 A1* | 1/2015 | Seo | ............ | H04J 11/005 370/252 |
| 2015/0110209 A1* | 4/2015 | Zhou | ............ | H04W 56/003 375/260 |
| 2015/0215761 A1* | 7/2015 | Chen | ............ | H04W 56/0015 370/255 |
| 2015/0327202 A1* | 11/2015 | Xu | ............ | H04W 56/0015 370/280 |
| 2015/0327224 A1* | 11/2015 | Guan | ............ | H04L 5/0053 370/329 |
| 2016/0105862 A1* | 4/2016 | Charbit | ............ | H04W 4/70 370/336 |
| 2016/0234706 A1* | 8/2016 | Liu | ............ | H04L 5/0048 |

FOREIGN PATENT DOCUMENTS

| | | |
|---|---|---|
| CN | 101035371 A | 9/2007 |
| CN | 101060513 A | 10/2007 |
| CN | 101110666 A | 1/2008 |
| CN | 101286787 A | 10/2008 |
| WO | 0062447 A1 | 10/2000 |
| WO | 2010075806 A1 | 7/2010 |
| WO | WO2014021632 A1 | 2/2014 |

OTHER PUBLICATIONS

Dieter Van Welden, TELIN Department, Ghent University, et al., Time Delay Estimation for KSP-OFDM Systems in Multipath Fading Channels, IEEE, 2009. XP31659668A.

* cited by examiner

SYNCHRONIZATION SIGNAL TRANSMISSION METHOD IN COMMUNICATION SYSTEM, AND SYNCHRONIZATION METHOD AND DEVICE

CROSS REFERENCE

This application is the 371 application of PCT Application No. PCT/CN2016/083930 filed on May 30, 2016, which is based upon and claims priority to Chinese Patent Application No. 201510464785.2, filed on Jul. 31, 2015, and the entire contents thereof are incorporated herein by reference.

TECHNICAL FIELD

The present application relates to, but not limited to, the technical field of radio communications, and more particularly to a synchronization signal transmission method, synchronization method and device in a communication system.

BACKGROUND

An Ultra-Dense Network (UDN) is one of key technologies for 5th Generation (5G) mobile communications. A great number of Transmission Points (TPs) are deployed in indoor crowded scenarios such as an office building, a supermarket, a railway station, a gymnasium and a dense residential area, to improve coverage and increase the transmission rate of data services, so that a demand of 1000-times data service volume in future 5G mobile communications can be met. It is necessary to solve the synchronization/discovery problem between communication nodes (TPs or terminals) in the UDN.

There are three inter-TP synchronization methods in the related art: the first one is satellite navigation synchronization; the second one is synchronization via an ideal cable return by utilizing an Institute of Electrical and Electronics Engineers (IEEE) 1588V2 standard; and the third one is synchronization by monitoring a synchronization signal in an air interface between TPs (called air interface synchronization for short). The UDN is probably deployed in a seriously-shielded area, such as an indoor area, with a weak satellite signal or no satellite signal, and the satellite navigation synchronization cannot be realized. Moreover, due to the limitation of deployment cost, it is difficult to install ideal cable return for all TPs of the UDN. Therefore, an inter-TP air interface synchronization manner is mainly considered.

Figure 1:
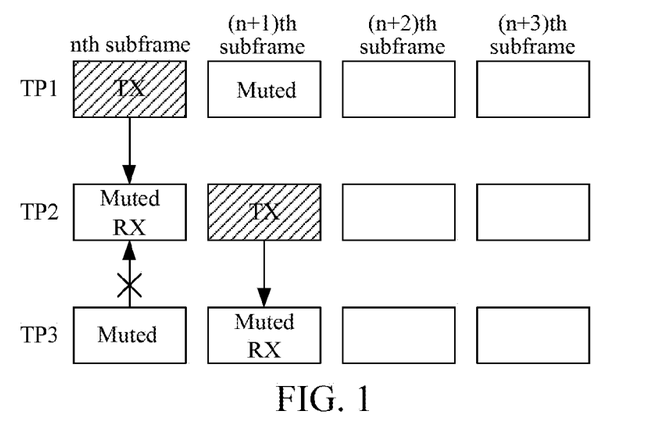
FIG. 1 is a schematic diagram of a CRS signal synchronization method of a small station under an LTE frame structure of the related art.

An inter-TP air interface synchronization method in the related art usually achieves air interface synchronization signal monitoring in a mute manner including a subframe-level mute manner and a special subframe Guard Period (GP)-level mute manner. The mute manner means that when a source TP transmits a synchronization signal, a target small base station stops transmitting own data in order to receive an air interface synchronization signal. Meanwhile, when a TP achieve multi-hop synchronization in a time division manner, a lower small station of the target small base station also keeps mute correspondingly, thereby avoiding interference. As shown in FIG. 1, at an nth (n is a positive integer greater than or equal to 1) subframe time, a TP1 transmits a synchronization signal, and a TP2 receives the synchronization signal mutely, and a TP3 also needs to be muted and does not transmit data to avoid interference to the TP2. Due to mute, neither the TP2 nor the TP3 can transmit data to a terminal at the nth subframe time, thereby increasing system overheads. Therefore, implementation of inter-TP air interface synchronization in the mute manner greatly reduces the using efficiency of radio resources.

A Long Term Evolution (LTE) Release 12 system solves the problems of terminal-based rapid TP discovery and synchronization through a discovery reference signal. The discovery reference signal includes a Common Reference Signal (CRS), a Primary Synchronization Signal (PSS)/Secondary Synchronization Signal (SSS), and a Channel State Information Reference Signal (CSI-RS), and overheads of the discovery reference signal are large, and interference between discovery reference signals and between a discovery reference signal and data will be caused.

An LTE system adds a Cyclic Prefix (CP) in front of each Orthogonal Frequency Division Multiplexing (OFDM) symbol, for solving the problems of interference between OFDM symbols and between subcarriers caused by multi-path delay and timing error. As the CP is longer, a supported maximum multi-path delay spread is longer, and corresponding coverage is larger. However, on the other hand, as the CP is longer, system overheads are larger. According to requirements for macro coverage, the LTE system supports two CP lengths namely a conventional CP of which the length is 144 Ts or 160 Ts, and an extended CP of which the length is 512 Ts, where Ts is an time unit of the LTE time domain, and Ts=1/30.72 µS. However, in the UDN, the coverage range of a communication node is greatly reduced (for example, the coverage range is tens of meters usually), and therefore there is great waste for the length of a traditional LTE CP.

SUMMARY

The following is a brief introduction for a subject described herein in detail. The brief introduction is not intended to restrict the scope of protection of claims.

How to implement synchronization and/or discovery between communication nodes in a UDN, to effectively avoid interferences between synchronization/discovery reference signals of different communication nodes or between a synchronization/discovery reference signal and a data signal and to increase the using efficiency of system resources whilst ensuring backward compatibility is a problem to be urgently solved.

The present disclosure provides a synchronization signal transmission and synchronization solution, to solve the problems of synchronization and/or discovery between communication nodes.

A synchronization signal transmission method in a communication system includes the steps as follows.

A communication node generates a radio frame. Herein, the radio frame includes N subframes, and each subframe includes M Orthogonal Frequency Division Multiplexing (OFDM) symbols and P synchronization signals, and each OFDM symbol includes a first Cyclic Prefix (CP) and an OFDM symbol data portion. Herein, data signals of the first CP are as same as data signals of a tail of the OFDM symbol data portion at a corresponding length, and N, M and P are positive integers, $0 \leq P \leq M$, and the synchronization signal includes a second CP and a synchronization signal data portion.

The communication node transmits the radio frame.

In an exemplary embodiment, the communication node includes a TP and/or a terminal.

In an exemplary embodiment, the length of the radio frame is 10 ms, and the length of the subframe is 1 ms, and M=14 or 12.

In an exemplary embodiment, data signals of the second CP are as same as data signals of a tail of the synchronization signal data portion at a corresponding length.

In an exemplary embodiment, in the subframe, the synchronization signal is located in front of the OFDM symbol.

In an exemplary embodiment, a sum of lengths of the first CP, the second CP and the synchronization signal data portion is 160 Ts, or 144 Ts, or 512 Ts, herein Ts is a time unit of an LTE time domain, and Ts=1/30.72 µs.

In an exemplary embodiment, the subframe further includes:

a GP.

The GP includes a first GP located in front of the synchronization signal, or a first GP located in front of the synchronization signal and a second GP located behind the synchronization signal.

In an exemplary embodiment, when the GP includes the first GP located in front of the synchronization signal, the sum of lengths of the first GP, the first CP, the second CP and the synchronization signal data portion is 160 Ts or 144 Ts or 512 Ts; and when the GP includes the first GP located in front of the synchronization signal and the second GP located behind the synchronization signal, a sum of lengths of the first GP, the second GP, the first CP, the second CP and the synchronization signal data portion is 160 Ts or 144 Ts or 512 Ts.

Herein Ts is a time unit of an LTE time domain, and Ts=1/30.72 µs.

In an exemplary embodiment, the GP is used for uplink and downlink conversion time and/or prevention of interference between uplink and downlink signals.

A synchronization method in a communication system includes the steps as follows.

A communication node receives a radio frame. The radio frame includes N subframes, and each subframe includes M OFDM symbols and P synchronization signals, and each OFDM symbol includes a first CP and an OFDM symbol data portion. Herein, data signals of the first CP are as same as data signals of a tail at a corresponding length, and N, M and P are positive integers, 0≤P≤M, and the synchronization signal includes a second CP and a synchronization signal data portion.

The communication node performs a synchronization processing according to the synchronization signals in the radio frame.

In an exemplary embodiment, the operation that the communication node performs a synchronization processing according to the synchronization signals in the radio frame includes that:

the communication node aligns CP headers of the OFDM symbols, deletes the first CPs, and performs an OFDM data processing according to the OFDM symbol data portions; and the communication node aligns CP headers of the synchronization signals, removes the second CPs, and performs the synchronization processing according to the synchronization signal data portions.

In an exemplary embodiment, the synchronization signal is located at a predetermined position in the subframe.

In an exemplary embodiment, when the communication node is one of TPs for hierarchical synchronization and a higher TP for the hierarchical synchronization transmits the synchronization signal, the communication node receives, when receiving a radio frame, the synchronization signal mutely at the predetermined position in each subframe of the radio frame.

In an exemplary embodiment, when the communication node is one of TPs for hierarchical synchronization and the synchronization signal is transmitted between other TPs for the hierarchical synchronization, the communication node is, when receiving a radio frame, muted at the predetermined position in each subframe of the radio frame.

In an exemplary embodiment, the communication node includes a TP and/or a terminal.

In an exemplary embodiment, the length of the radio frame is 10 ms, and the length of the subframe is 1 ms, and M=14 or 12.

In an exemplary embodiment, data signals of the second CP are as same as data signals of a tail of the synchronization signal data portion at a corresponding length.

In an exemplary embodiment, in the subframe, the synchronization signal is located in front of the OFDM symbol.

In an exemplary embodiment, the sum of lengths of the first CP, the second CP and the synchronization signal data portion is 160 Ts, or 144 Ts, or 512 Ts, herein Ts is a time unit of an LTE time domain, and Ts=1/30.72 µs.

In an exemplary embodiment, the subframe further includes:

a first GP located in front of the synchronization signal, or a first GP located in front of the synchronization signal and a second GP located behind the synchronization signal.

In an exemplary embodiment, when the subframe further includes the first GP located in front of the synchronization signal, the sum of lengths of the first GP, the first CP, the second CP and the synchronization signal data portion is 160 Ts or 144 Ts or 512 Ts; and when the subframe further includes the first GP located in front of the synchronization signal and the second GP located behind the synchronization signal, the sum of lengths of the first GP, the second GP, the first CP, the second CP and the synchronization signal data portion is 160 Ts or 144 Ts or 512 Ts.

Herein, Ts is a time unit of an LTE time domain, and Ts=1/30.72 µs.

In an exemplary embodiment, the first GP and the second GP are used for uplink and downlink conversion time and/or prevention of interference between uplink and downlink signals.

A synchronization signal transmission device in a communication system, arranged in a communication node, includes a framing module and a transmitting module.

The framing module is configured to generate a radio frame. The radio frame includes N subframes, and each subframe includes M OFDM symbols and P synchronization signals, and each OFDM symbol includes a first CP and an OFDM symbol data portion. Herein, data signals of the first CP are as same as data signals of a tail of the OFDM symbol data portion at a corresponding length, and N, M and P are positive integers, 0≤P≤M, and the synchronization signal includes a second CP and a synchronization signal data portion.

The transmitting module is configured to transmit the radio frame.

In an exemplary embodiment, the communication node includes a TP and/or a terminal.

In an exemplary embodiment, the length of the radio frame is 10 ms, and the length of the subframe is 1 ms, and M=14 or 12.

In an exemplary embodiment, data signals of the second CP are as same as data signals of a tail of the synchronization signal data portion at a corresponding length.

In an exemplary embodiment, in the subframe, the synchronization signal is located in front of the OFDM symbol.

In an exemplary embodiment, the sum of lengths of the first CP, the second CP and the synchronization signal data portion is 160 Ts, or 144 Ts, or 512 Ts, herein Ts is a time unit of an LTE time domain, and Ts=1/30.72 µs.

In an exemplary embodiment, the subframe further includes:

a GP.

The GP includes a first GP located in front of the synchronization signal, or a first GP located in front of the synchronization signal and a second GP located behind the synchronization signal.

In an exemplary embodiment, when the GP includes the first GP located in front of the synchronization signal, the sum of lengths of the first GP, the first CP, the second CP and the synchronization signal data portion is 160 Ts or 144 Ts or 512 Ts; and when the GP includes the first GP located in front of the synchronization signal and the second GP located behind the synchronization signal, the sum of lengths of the first GP, the second GP, the first CP, the second CP and the synchronization signal data portion is 160 Ts or 144 Ts or 512 Ts.

Herein, Ts is a time unit of the LTE time domain, and Ts=1/30.72 µs.

In an exemplary embodiment, the GP is used for uplink and downlink conversion time and/or prevention of interference between uplink and downlink signals.

A synchronization device in a communication system, arranged in a communication node, includes a receiving module and a processing module.

The receiving module is configured to receive a radio frame. The radio frame includes N subframes, and each subframe includes M OFDM symbols and P synchronization signals, and each OFDM symbol includes a first CP and an OFDM symbol data portion. Herein, data signals of the first CP are as same as data signals of a tail of the OFDM symbol data portion at a corresponding length, and N, M and P are positive integers, 0≤P≤M, and the synchronization signal includes a second CP and a synchronization signal data portion.

The processing module is configured to perform a synchronization processing according to the synchronization signals in the radio frame.

In an exemplary embodiment, the processing module is configured to:

align CP headers of the OFDM symbols, delete the first CPs, and perform an OFDM data processing according to the OFDM symbol data portions; and align CP headers of the synchronization signals, remove the second CPs, and perform the synchronization processing according to the synchronization signal data portions.

In an exemplary embodiment, the synchronization signal is located at a predetermined position in the subframe.

In an exemplary embodiment, when the communication node is one of TPs for hierarchical synchronization and a higher TP for the hierarchical synchronization transmits the synchronization signal, the receiving module is configured to: receive, when receiving a radio frame, the synchronization signal mutely at the predetermined position in each subframe of the radio frame.

In an exemplary embodiment, when the communication node is one of TPs for hierarchical synchronization and the synchronization signal is transmitted between other TPs for the hierarchical synchronization, the receiving module is configured to: be, when receiving a radio frame, muted at the predetermined position in each subframe of the radio frame.

In an exemplary embodiment, the communication node includes a TP and/or a terminal.

In an exemplary embodiment, the length of the radio frame is 10 ms, and the length of the subframe is 1 ms, and M=14 or 12.

In an exemplary embodiment, data signals of the second CP are as same as data signals of a tail of the synchronization signal data portion at a corresponding length.

In an exemplary embodiment, in the subframe, the synchronization signal is located in front of the OFDM symbol.

In an exemplary embodiment, the sum of lengths of the first CP, the second CP and the synchronization signal data portion is 160 Ts, or 144 Ts, or 512 Ts, herein Ts is a time unit of an LTE time domain, and Ts=1/30.72 µs.

In an exemplary embodiment, the subframe further includes:

a first GP located in front of the synchronization signal, or a first GP located in front of the synchronization signal and a second GP located behind the synchronization signal.

In an exemplary embodiment, when the subframe further includes the first GP located in front of the synchronization signal, the sum of lengths of the first GP, the first CP, the second CP and the synchronization signal data portion is 160 Ts or 144 Ts or 512 Ts; and when the subframe further includes the first GP located in front of the synchronization signal and the second GP located behind the synchronization signal, the sum of lengths of the first GP, the second GP, the first CP, the second CP and the synchronization signal data portion is 160 Ts or 144 Ts or 512 Ts.

Herein Ts is a time unit of an LTE time domain, and Ts=1/30.72 µs.

In an exemplary embodiment, the first GP and the second GP are used for uplink and downlink conversion time and/or prevention of interference between uplink and downlink signals.

A radio frame structure is provided. The radio frame includes N subframes, and each subframe includes M OFDM symbols and P synchronization signals, and each OFDM symbol includes a first CP and an OFDM symbol data portion. Herein, data signals of the first CP are as same as data signals of a tail of the OFDM symbol data portion at a corresponding length, and N, M and P are positive integers, 0≤P≤M, and the synchronization signal includes a second CP and a synchronization signal data portion.

In an exemplary embodiment, the length of the radio frame is 10 ms, and the length of the subframe is 1 ms, and M=14 or 12.

In an exemplary embodiment, data signals of the second CP are as same as data signals of a tail of the synchronization signal data portion at a corresponding length.

In an exemplary embodiment, in the subframe, the synchronization signal is located in front of the OFDM symbol.

In an exemplary embodiment, the sum of lengths of the first CP, the second CP and the synchronization signal data portion is 160 Ts, or 144 Ts, or 512 Ts, herein Ts is a time unit of an LTE time domain, and Ts=1/30.72 µs.

In an exemplary embodiment, the subframe further includes:

a GP.

The GP includes a first GP located in front of the synchronization signal, or a first GP located in front of the synchronization signal and a second GP located behind the synchronization signal.

In an exemplary embodiment, when the GP includes the first GP located in front of the synchronization signal, the sum of lengths of the first GP, the first CP, the second CP and the synchronization signal data portion is 160 Ts or 144 Ts or 512 Ts; and when the GP includes the first GP located in front of the synchronization signal and the second GP located behind the synchronization signal, the sum of lengths of the first GP, the second GP, the first CP, the second CP and the synchronization signal data portion is 160 Ts or 144 Ts or 512 Ts.

Herein, Ts is a time unit of an LTE time domain, and Ts=1/30.72 μs.

In an exemplary embodiment, the GP is used for uplink and downlink conversion time and/or prevention of interference between uplink and downlink signals.

A computer-readable storage medium stores a computer-executable instruction. When the computer-executable instruction is executed by a processor, the above-mentioned method is implemented.

In the transmission method provided by embodiments of the present disclosure, transmission of synchronization signals may not occupy existing LTE resources, and a CP length of an OFDM symbol is shortened instead by utilizing the characteristic of small TP coverage range in a UDN, and remaining CP resources are used for the transmission of synchronization signals. By fully utilizing the CP of the LTE system to bear synchronization signals, the embodiments of the present disclosure not only save overheads and reduce interference between synchronization signals and data, but also can ensure the backward compatibility of traditional terminals. The transmission method in the embodiments of the present disclosure is additionally characterized by bearing synchronization signals instead of information or modulated information in the CP. Because the content of the synchronization signal may be appointed or configured in advance, a receiving end has known the content of the synchronization signal transmitted by a transmitting end before receiving the synchronization signal, and may utilize the known synchronization signal to complete measurement of time offset or frequency offset or signal strength. This breaks a viewpoint in a traditional thinking where the receiving end does not know the content of information transmitted by the transmitting end before receiving a signal bearing information.

In the synchronization method provided in the embodiments of the present disclosure, TP synchronization mute only occupies remaining CP resources, and does not use existing LTE resources, and subframe-level mute or special subframe mute is not needed. Therefore, in small stations synchronization processing can be performed, and data can also be transmitted to a terminal simultaneously, and the system throughput is not reduced, and the TP system efficiency is increased, and the problems in a TP synchronization manner (for example, CRS synchronization) in the related art, where a target cell cannot transmit data at a corresponding subframe and the system throughput is reduced due to the fact that subframe-level mute or special subframe mute is required for the target cell and a lower cell, are avoided.

After the drawings and the detailed descriptions are read and understood, other aspects can be understood.

DETAILED DESCRIPTION

Embodiments of the present disclosure will be described below in conjunction with the drawings and the embodiments.

It is important to note that the embodiments of the present disclosure and the features in the embodiments may be mutually combined with no conflicts, and the combinations will fall within the scope of protection of the present application. In addition, although a logic sequence is shown in the flowchart, the shown or described steps may be executed in a sequence different from the sequence here under certain conditions.

To simplify the following description of an LTE system, it is supposed that a system bandwidth configuration is 20 MHz and a sampling rate is 30.72 MHz. They are not limited thereto during practical applications.

Figure 2:
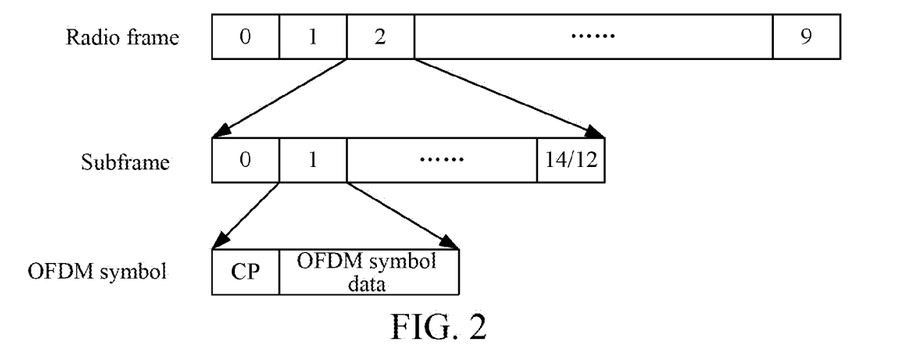
FIG. 2 is a schematic diagram of an OFDM symbol frame structure of an LTE system in the related art.

FIG. 2 is a schematic diagram of an OFDM symbol frame structure of an LTE system in the related art. A radio frame contains ten subframes, and each subframe contains 14 or 12 OFDM symbols, and each symbol contains CP and OFDM symbol data. For a conventional CP, each subframe contains 14 OFDM symbols, and the lengths of the conventional CP include two types, i.e., 144 Ts and 160 Ts respectively. For an extended CP, each subframe contains 12 OFDM symbols, and the length of the extended CP is 512 Ts.

In embodiments of the present disclosure, in a 5G mobile communication UDN scenario a CP length can be shortened, and remaining CP resources can be utilized to transmit a synchronization signal.

Embodiment One

Figure 3:
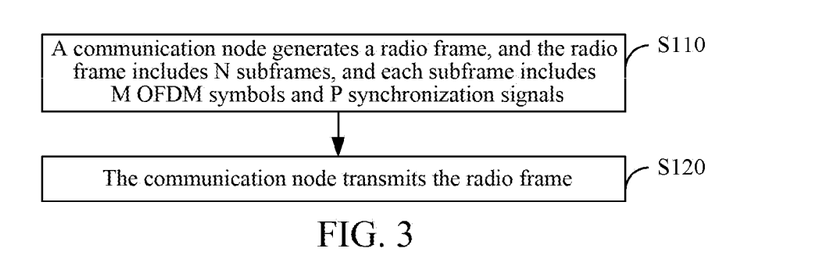
FIG. 3 is a flowchart of a synchronization signal transmission method in a communication system according to embodiment one.

As shown in FIG. 3, a synchronization signal transmission method in a communication system includes the steps S110-S120 as follows.

In S110, a communication node generates a radio frame, and the radio frame includes N subframes, and each subframe includes M OFDM symbols and P synchronization signals, and each OFDM symbol includes a first CP and an OFDM symbol data portion. Herein, data signals of the first CP are as same as data signals of a tail of the OFDM symbol data portion at a corresponding length, and N, M and P are positive integers, and $0 \leq P \leq M$, and the synchronization signal includes a second CP and a synchronization signal data portion.

In S120, the communication node transmits the radio frame.

In the present embodiment, the sum of lengths of a first CP and a synchronization signal may be, but not limited to, equal to the length of a CP (conventional or extended CP) in a system in the related art.

Figure 4:
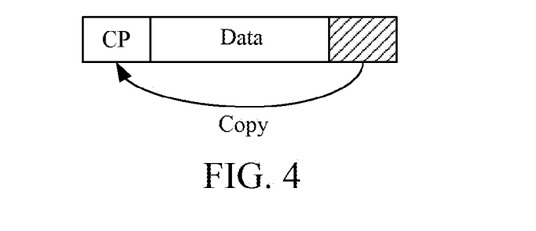
FIG. 4 is a schematic diagram of a CP generated by copying a segment of the tail of a data portion.

In the present embodiment, that data signals of the first CP are as same as data signals of a tail of the OFDM symbol data portion at a corresponding length may be, in other words, that the last digit of the OFDM symbol data portion and data signals in front of the last digit are copied to serve as the first CP, as shown in FIG. 4. The corresponding length is the length of the first CP.

In an exemplary embodiment, the synchronization signal is located at a predetermined position in the subframe. The predetermined position is also referred to as a synchronization signal area hereinafter.

In an exemplary embodiment, the communication node includes a TP and/or a terminal.

In an exemplary embodiment, the length of the radio frame is 10 ms, and the length of the subframe is 1 ms, and M=14 or 12.

In an exemplary embodiment, that data signals of the second CP are as same as data signals of a tail of the synchronization signal data portion at a corresponding length may be, in other words, that the last digit of the synchronization signal data portion and data signals in front of the last digit are copied to serve as the second CP, as shown in FIG. 4. The corresponding length is the length of the second CP.

In an exemplary embodiment, in the subframe, the synchronization signal is located in front of the OFDM symbol.

In an exemplary embodiment, the sum of lengths of the first CP, the second CP and the synchronization signal data portion is 160 Ts, or 144 Ts, or 512 Ts, where Ts=1/30.72 μs.

In an exemplary embodiment, the subframe further includes a GP.

The GP includes:
a first GP located in front of the synchronization signal, or
a first GP located in front of the synchronization signal and a second GP located behind the synchronization signal.

In an exemplary embodiment, when the GP includes the first GP located in front of the synchronization signal, the sum of lengths of the first GP, the first CP, the second CP and the synchronization signal data portion is 160 Ts or 144 Ts or 512 Ts; and when the GP includes the first GP located in front of the synchronization signal and the second GP located behind the synchronization signal, the sum of lengths of the first GP, the second GP, the first CP, the second CP and the synchronization signal data portion is 160 Ts or 144 Ts or 512 Ts.

In an exemplary embodiment, the GP is used for uplink and downlink conversion time and/or prevention of interference between uplink and downlink signals.

The embodiment one is further described below with three examples.

Example One

A synchronization signal transmission method in a communication system includes the steps as follows.

A communication node transmits a signal according to a radio frame.

Figure 5:
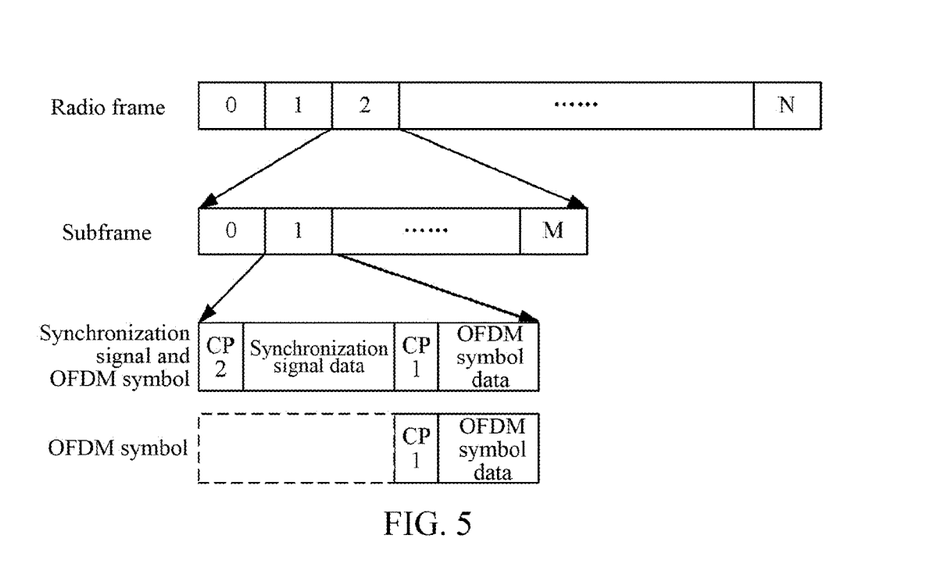
FIG. 5 is a schematic diagram of a radio frame in example one.

As shown in FIG. 5, the radio frame includes N subframes, and each subframe includes M OFDM symbols and P synchronization signals.

The OFDM symbol includes a CP1 and an OFDM symbol data portion, herein data signals of the CP1 are as same as data signals of a tail of the OFDM symbol data portion at a length.

The synchronization signal includes a CP2 and a synchronization signal data portion, herein data signals of the CP2 are as same as data signals of a tail of the synchronization signal data portion at a length.

Herein, $0 \leq P \leq M$.

The sum of lengths of the CP1, the CP2 and the synchronization signal data portion is 160 Ts, or 144 Ts, or 512 Ts, where Ts=1/30.72 μs, and 144 Ts and 160 Ts correspond to a conventional CP of an LTE system, and 512 Ts corresponds to an extended CP of the LTE system.

The lengths of the CP1, the CP2 and the synchronization signal data portion are defined as Table 1.

TABLE 1

| Lengths of CP1, CP2 and synchronization signal data portion | | | |
|---|---|---|---|
| Sum of length | 144Ts | 160Ts | 512Ts |
| CP2 | 40Ts | 40Ts | 128Ts |
| Synchronization signal data portion | 64Ts | 64Ts | 256Ts |
| CP1 | 40Ts | 56Ts | 128Ts |

Example Two

A synchronization signal transmission method in a communication system includes the steps as follows.

A communication node transmits a signal according to a radio frame.

Figure 6:
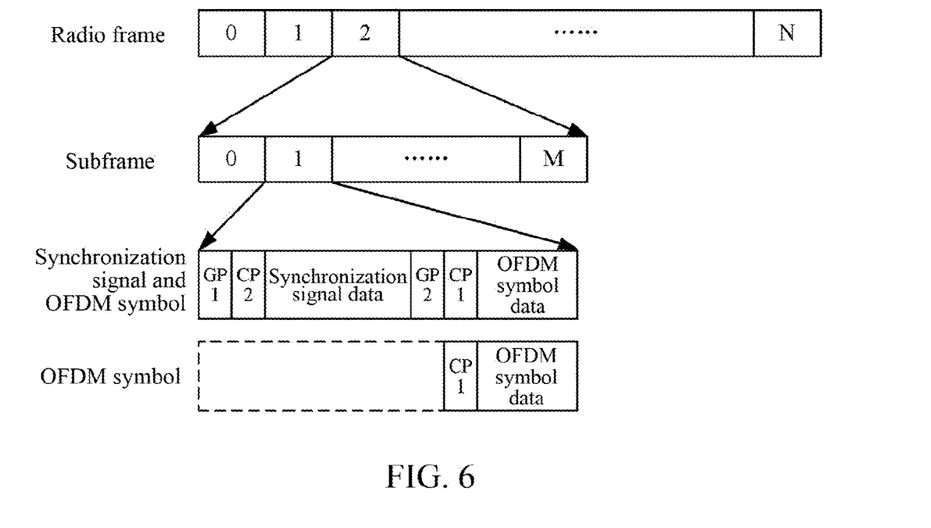
FIG. 6 is a schematic diagram of a radio frame in example two.

As shown in FIG. 6, the radio frame includes N subframes, and each subframe includes M OFDM symbols, P synchronization signals and a GP.

The OFDM symbol includes a CP1 and an OFDM symbol data portion, herein data signals of the CP1 are as same as data signals of a tail of the OFDM symbol data portion at a length.

The synchronization signal includes a CP2 and a synchronization signal data portion, herein data signals of the CP2 are as same as data signals of a tail of the synchronization signal data portion at a length.

The GP includes a GP1 and a GP2. Herein, the GP1 is located in front of the synchronization signal, and provides uplink and downlink switching protection for previous OFDM symbol data and current synchronization signal data, and the GP2 is located behind the synchronization signal and in front of the CP1, and provides uplink and downlink switching protection for current synchronization signal data and current OFDM symbol data.

Herein, $0 \leq P \leq M$.

The sum of lengths of the CP1, the CP2, the GP1, the GP2 and the synchronization signal data portion is 160 Ts, or 144

Ts, or 512 Ts, where Ts=1/30.72 μs, and 144 Ts and 160 Ts correspond to a conventional CP of an LTE system, and 512 Ts corresponds to an extended CP of the LTE system.

The lengths of the CP1, the CP2, the GP1, the GP2 and the synchronization signal data portion are defined as Table 2.

TABLE 2

| Lengths of CP1, CP2, GP1, GP2 and synchronization signal data portion | | | |
|---|---|---|---|
| Sum of length | 144Ts | 160Ts | 512Ts |
| GP1 | 16Ts | 16Ts | 32Ts |
| CP2 | 32Ts | 32Ts | 64Ts |
| Synchronization signal data portion | 62Ts | 62Ts | 256Ts |
| GP2 | 2Ts | 2Ts | 32Ts |
| CP1 | 32Ts | 48Ts | 128Ts |

Example Three

A synchronization signal transmission method in a communication system includes the steps as follows.

A communication node transmits a signal according to a radio frame.

Figure 7:
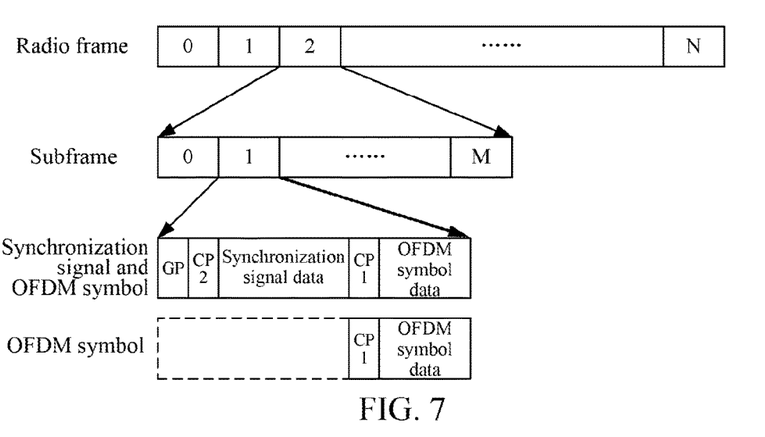
FIG. 7 is a schematic diagram of a radio frame in example three.

As shown in FIG. 7, the radio frame includes N subframes, and each subframe includes M OFDM symbols, P synchronization signals and a GP.

The OFDM symbol includes a CP1 and an OFDM symbol data portion, herein data signals of the CP1 are as same as data signals of a tail of the OFDM symbol data portion at a length.

The synchronization signal includes a CP2 and a synchronization signal data portion, herein data signals of the CP2 are as same as data signals of a tail of the synchronization signal data portion at a length.

The GP is located in front of the synchronization signal, and provides uplink and downlink switching protection for previous OFDM symbol data and current synchronization signal data, and uplink and downlink switching protection for current synchronization signal data and current OFDM symbol data is completed by processing synchronization signal data in advance.

Herein, 0≤P≤M.

The sum of lengths of the CP1, the CP2, the GP and synchronization signal data portion is 144 Ts, or 160 Ts, or 512 Ts, where Ts=1/30.72 μs, and 144 Ts and 160 Ts correspond to a conventional CP of an LTE system, and 512 Ts corresponds to an extended CP of the LTE system.

The lengths of the CP1, the CP2, the GP and the synchronization signal data portion are defined as Table 3.

TABLE 3

| Lengths of CP1, CP2, GP and synchronization signal data portion | | | |
|---|---|---|---|
| Sum of length | 144Ts | 160Ts | 512Ts |
| GP | 16Ts | 16Ts | 64Ts |
| CP2 | 32Ts | 32Ts | 64Ts |
| Synchronization signal data portion | 64Ts | 64Ts | 256Ts |
| CP1 | 32Ts | 48Ts | 128Ts |

Embodiment Two

Figure 8:
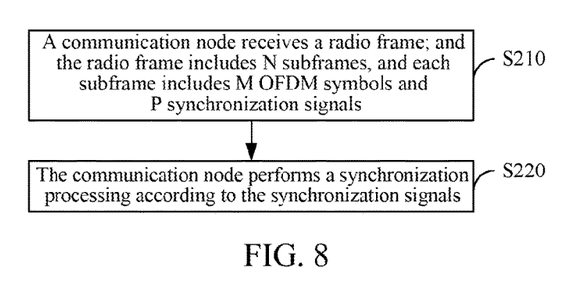
FIG. 8 is a flowchart of a synchronization method in a communication system according to embodiment two.

As shown in FIG. 8, a synchronization method in a communication system includes the steps S210-S220 as follows.

In S210, a communication node receives a radio frame; and the radio frame includes N subframes, and each subframe includes M OFDM symbols and P synchronization signals; and each OFDM symbol includes a first CP and an OFDM symbol data portion. Herein, data signals of the first CP are as same as data signals of a tail of the OFDM symbol data portion at a corresponding length, and N, M and P are positive integers, and 0≤P≤M, and the synchronization signal includes a second CP and a synchronization signal data portion.

In S220, the communication node performs a synchronization processing according to the synchronization signals in the radio frame.

In an exemplary embodiment, S220 includes the operations as follows.

The communication node aligns CP headers of the OFDM symbols, deletes the first CPs, and performs an OFDM data processing according to the OFDM symbol data portions; and the communication node aligns CP headers of the synchronization signals, removes the second CPs, and performs a synchronization processing according to the synchronization signal data portions.

If the communication node is a TP, the synchronization processing may refer to continuously transmitting a synchronization signal to a lower TP for hierarchical synchronization according to the method in the embodiment one; and if the communication node is a terminal, the synchronization processing may refer to timing/frequency synchronization.

When the communication node is a traditional terminal, the first CP and the synchronization signal are directly abandoned, and the synchronization processing is not performed according to the synchronization signal.

In an exemplary embodiment, the synchronization signal is located at a predetermined position in the subframe.

When the communication node is one of TPs for hierarchical synchronization and a higher TP for the hierarchical synchronization transmits the synchronization signal, the communication node receives, when receiving a radio frame, the synchronization signal mutely at the predetermined position in each subframe of the radio frame. In addition, if the communication node is not the last-level TP for the hierarchical synchronization, the synchronization signal will be transmitted continuously to a lower TP for the hierarchical synchronization at next time according to the description in the embodiment one after being received.

In an exemplary embodiment, when the communication node is one of TPs for hierarchical synchronization and the synchronization signal is transmitted between other TPs for the hierarchical synchronization, the communication node is muted at the predetermined position in each subframe of a radio frame when receiving the radio frame.

In an exemplary embodiment, the communication node includes a TP and/or a terminal.

In an exemplary embodiment, other features of the radio frame may refer to the embodiment one.

Compared to a synchronization manner (for example, CRS synchronization) in the related art, the synchronization method according to the synchronization signal in the present embodiment does not need subframe mute or special subframe mute, thereby reducing system overheads, and increasing the system throughput.

FIG. 1 is a schematic diagram of a CRS signal synchronization method of a TP under an LTE frame structure of the related art, as follows.

It is supposed that there are three TPs (TP1, TP2 and TP3) for hierarchical synchronization, namely synchronization from the TP2 to the TP1 and synchronization from the TP3 to the TP2.

At an nth (n is a positive integer greater than or equal to 1) subframe time, the TP1 transmits a CRS synchronization signal to the TP2. At this time, the TP1 is a transmitter TX, and the TP2 is a receiver RX; and the TP2 should be muted and defined as MONITORING at the nth subframe time, so the TP2 cannot transmit downlink data to a terminal, thereby bringing system overheads.

Meanwhile, to avoid interference to receiving of a synchronization signal of the TP2 by the TP3 at the nth subframe time, the TP3 should be muted and defined as NOT TRANSMITTING, so the TP3 cannot transmit downlink data to the terminal, thereby also increasing system overheads.

Likewise, at an (n+1)th subframe time, the TP2 transmits a CRS synchronization signal to the TP3. At this time, the TP2 is a transmitter TX, and the TP3 is a receiver RX; and the TP3 should be muted and defined as MONITORING at the (n+1)th time, so the TP3 cannot transmit downlink data to a terminal, thereby bringing system overheads.

Meanwhile, to avoid interference to receiving of a synchronization signal of the TP3 by the TP1 at the (n+1)th subframe time, the TP1 should be muted and defined as NOT TRANSMITTING, so the TP1 cannot transmit downlink data to the terminal, thereby also increasing system overheads.

It can be seen that the inter-TP synchronization manner in the related art will increase the system overheads. But, CP mute instead of subframe mute or special subframe mute is required for the synchronization method according to the synchronization signal in the present embodiment. Because the CP does not occupy the system overheads, the synchronization method in the present embodiment does not occupy the system overheads, and increases the system throughput as compared to the synchronization manner in the related art.

The embodiment two will be further described below with four examples.

Example Four

A synchronization method between communication nodes, implemented based on a synchronization signal, includes the following steps.

A communication node receives the synchronization signal. The receiving manner includes one of the following manners:

deleting a CP in the synchronization signal and a CP in an adjacent OFDM symbol; and deleting a synchronization signal data portion, a CP in the synchronization signal and a CP in an adjacent OFDM symbol.

The communication node includes a TP and/or a terminal.

The TP may include one or more of the following: evolved Node B (eNB) and relay nodes in different forms, such as macro eNB, microcell, picocell, femtocell, home eNB and relay station.

Example Five

A synchronization method between a TP and a TP according to a synchronization signal is as follows.

It is supposed that there are three TPs (TP1, TP2 and TP3) for hierarchical synchronization, namely synchronization from the TP2 to the TP1 and synchronization from the TP3 to the TP2.

Figure 9:
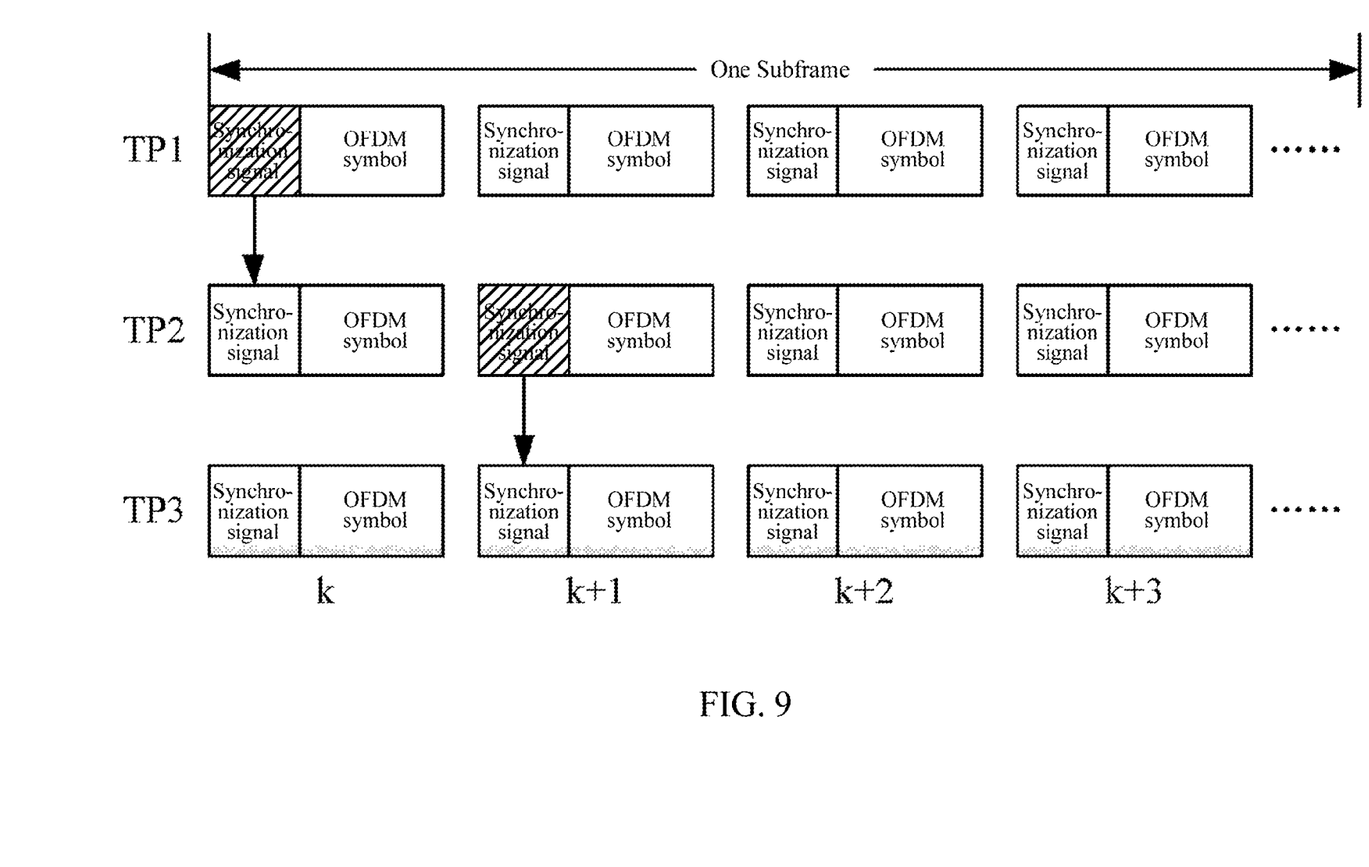
FIG. 9 is a schematic diagram of a synchronization method between TPs according to example five.

As shown in FIG. 9, each subframe includes M synchronization signals and M OFDM symbols.

At a kth (k is a positive integer greater than or equal to 1) synchronization signal time, the TP1 transmits a synchronization signal to the TP2 in a synchronization signal area, and the synchronization signal area of the TP2 is defined as MUTED AND RECEIVING, and the synchronization signal area of the TP3 is defined as MUTED AND NOT TRANSMITTING, to avoid interference to the TP2. Meanwhile, OFDM symbol areas of the TP1, the TP2 and the TP3 are normally defined as TRANSMITTING or RECEIVING, and normal data transmission between the TPs and a terminal is not influenced.

At a (k+1)th time, the TP2 transmits a synchronization signal to the TP3 in a synchronization signal area, and the synchronization signal area of the TP3 is defined as MUTED AND RECEIVING, and the synchronization signal area of the TP1 is defined as MUTED AND NOT TRANSMITTING to avoid interference to the TP3. Meanwhile, OFDM symbol areas of the TP1, the TP2 and the TP3 are normally defined as TRANSMITTING or RECEIVING, and normal data transmission between the TPs and a terminal is not influenced.

By parity of reasoning, in a process of performing the TP synchronization according to the synchronization signal in the present example, it is unnecessary to perform a mute setting on subframes or special subframes.

Therefore, compared with the synchronization manner in the related art, the synchronization method in the present example reduces overheads for subframe or special subframe mute, and increases the system throughput.

Example Six

A method for synchronization between a terminal and a TP according to a synchronization signal is as follows, herein the terminal is a terminal supporting the synchronization signal.

The TP transmits the synchronization signal and OFDM symbol data in a format of a radio frame as shown in FIG. 6.

The terminal receives the synchronization signal and the OFDM symbol data.

Figure 10:
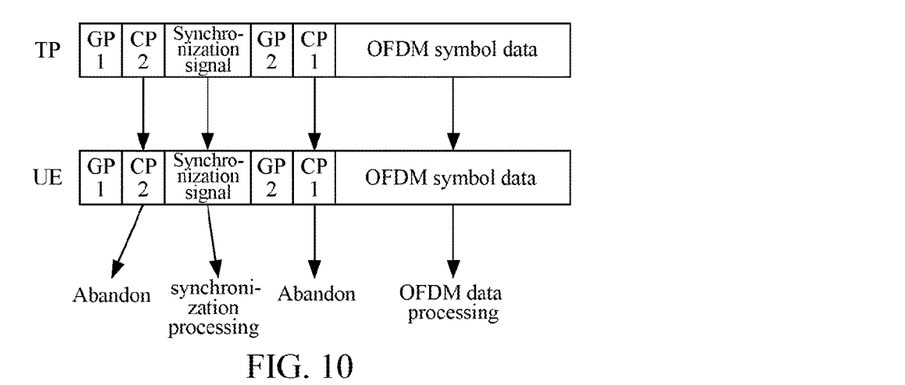
FIG. 10 is a schematic diagram of a synchronization method between a terminal supporting the synchronization signal and a TP according to example six.

A processing manner after the terminal receives the synchronization signal, as shown in FIG. 10, includes: aligning CP headers of the OFDM symbol data, removing a CP1, and receiving the OFDM symbol data to perform an OFDM data processing; and aligning CP headers of the synchronization signal, removing a CP2, and receiving the synchronization signal to perform a synchronization processing.

The OFDM data processing process is the same as an OFDM symbol data processing process of an existing LTE system.

The synchronization processing includes: timing synchronization between the terminal supporting the synchronization signal and the TP, herein the accuracy meets a timing synchronization requirement specified by an LTE R12 system.

The synchronization processing further includes: frequency synchronization between the terminal supporting the synchronization signal and the TP, herein the accuracy meets a frequency synchronization requirement specified by an LTE R12 system.

The synchronization signal processing further includes a process of performing, by the terminal supporting the synchronization signal, a strength measurement on the synchronization signal transmitted by the TP.

Example Seven

A method for synchronization between a traditional terminal and a TP according to a synchronization signal is as follows.

The TP transmits the synchronization signal and OFDM symbol data in a format of a radio frame as shown in FIG. 6.

The traditional terminal receives the synchronization signal and the OFDM symbol data.

Figure 11:
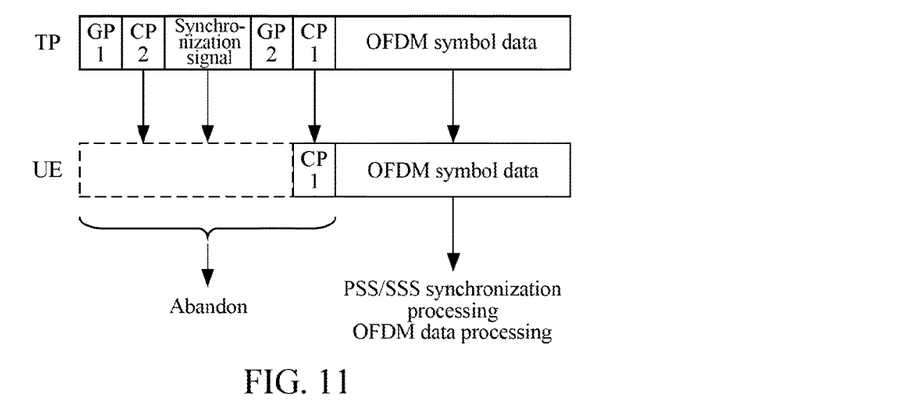
FIG. 11 is a schematic diagram of a synchronization method between a traditional terminal and a TP according to example seven.

A processing manner after the traditional terminal receives the synchronization signal, as shown in FIG. 11, includes: aligning CP headers of the OFDM symbol data, removing a CP1, a CP2 and synchronization signal data, and receiving the OFDM symbol data to perform an OFDM data processing.

The OFDM data processing process is the same as an existing OFDM symbol data processing process of an LTE system, and includes a PSS/SSS-based synchronization processing process.

It can be seen that the synchronization method in the embodiment of the present disclosure only abandons a synchronization signal during processing of terminal of the related art, and does not bring any influence on CP protection, and processing for receiving signal is consistent with the process in the related art. Therefore, the synchronization signal transmission method and the synchronization method in embodiments of the present disclosure do not influence the processing of the traditional terminal, and are compatible with the traditional terminal.

Embodiment Three

Figure 12:
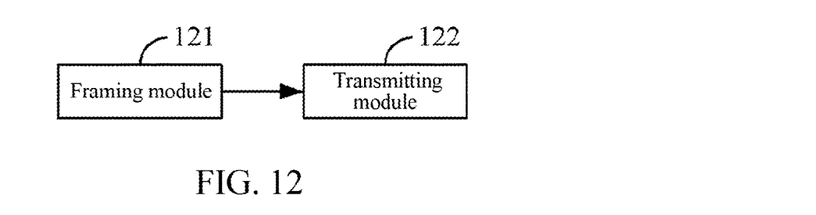
FIG. 12 is a schematic diagram of a synchronization signal transmission device in a communication system according to embodiment three.

As shown in FIG. 12, a synchronization signal transmission device in a communication system, arranged in a communication node, includes a framing module 121 and a transmitting module 122.

The framing module 121 is configured to generate a radio frame. Herein, the radio frame includes N subframes, and each subframe includes M OFDM symbols and P synchronization signals, and each OFDM symbol includes a first CP and an OFDM symbol data portion. Herein, data signals of the first CP are as same as data signals of a tail of the OFDM symbol data portion at a corresponding length, and N, M and P are positive integers, and 0≤P≤M. The synchronization signal includes a second CP and a synchronization signal data portion.

The transmitting module 122 is configured to transmit the radio frame.

In an exemplary embodiment, the communication node includes a TP and/or a terminal.

In an exemplary embodiment, the length of the radio frame is 10 ms, and the length of the subframe is 1 ms, and M=14 or 12.

In an exemplary embodiment, data signals of the second CP are as same as data signals of a tail of the synchronization signal data portion at a corresponding length.

In an exemplary embodiment, in the subframe, the synchronization signal is located in front of the OFDM symbol.

In an exemplary embodiment, the sum of lengths of the first CP, the second CP and the synchronization signal data portion is 160 Ts, or 144 Ts, or 512 Ts, where Ts=1/30.72 μs.

In an exemplary embodiment, the subframe further includes:

a GP.

The GP includes a first GP located in front of the synchronization signal, or a first GP located in front of the synchronization signal and a second GP located behind the synchronization signal.

In an exemplary embodiment, when the GP includes the first GP located in front of the synchronization signal, the sum of lengths of the first GP, the first CP, the second CP and the synchronization signal data portion is 160 Ts or 144 Ts or 512 Ts; and when the GP includes the first GP located in front of the synchronization signal and the second GP located behind the synchronization signal, the sum of lengths of the first GP, the second GP, the first CP, the second CP and the synchronization signal data portion is 160 Ts or 144 Ts or 512 Ts.

In an exemplary embodiment, the GP is used for uplink and downlink conversion time and/or prevention of interference between uplink and downlink signals.

Other implementation details may refer to the embodiment one.

Embodiment Four

Figure 13:
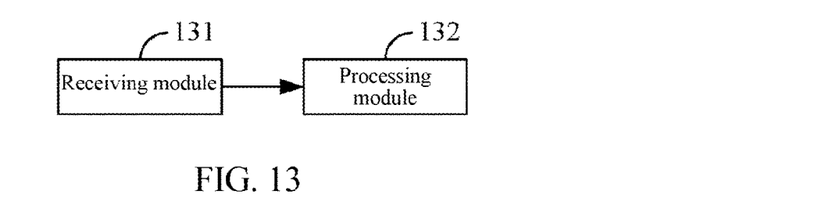
FIG. 13 is a schematic diagram of a synchronization device in a communication system according to embodiment four.

As shown in FIG. 13, a synchronization device in a communication system, arranged in a communication node, includes a receiving module 131 and a processing module 132.

The receiving module 131 is configured to receive a radio frame. Herein, the radio frame includes N subframes, and each subframe includes M OFDM symbols and P synchronization signals, and each OFDM symbol includes a first CP and an OFDM symbol data portion. Herein, data signals of the first CP are as same as data signals of a tail of the OFDM symbol data portion at a corresponding length, and N, M and P are positive integers, and 0≤P≤M. The synchronization signal includes a second CP and a synchronization signal data portion.

The processing module 132 is configured to perform a synchronization processing according to the synchronization signals in the radio frame.

In an exemplary embodiment, the processing module 132 is configured to align CP headers of the OFDM symbols, delete the first CPs, and perform an OFDM data processing according to the OFDM symbol data; and align CP headers of the synchronization signals, remove the second CPs, and perform a synchronization processing according to the synchronization signal data portions.

In an exemplary embodiment, the synchronization signal is located at a predetermined position in the subframe.

In an exemplary embodiment, when the communication node is one of TPs for hierarchical synchronization and a higher TP for the hierarchical synchronization transmits the synchronization signal, the receiving module 131 is configured to receive the synchronization signal mutely at the predetermined position in each subframe of a radio frame when receiving the radio frame.

In an exemplary embodiment, when the communication node is one of TPs for hierarchical synchronization and the synchronization signal is transmitted between other TPs for the hierarchical synchronization, the receiving module 131 is configured to be muted at the predetermined position in each subframe of a radio frame when receiving the radio frame.

In an exemplary embodiment, the communication node includes a TP and/or a terminal.

In an exemplary embodiment, the length of the radio frame is 10 ms, and the length of the subframe is 1 ms, and M=14 or 12.

In an exemplary embodiment, data signals of the second CP are as same as data signals of a tail of the synchronization signal data portion at a corresponding length.

In an exemplary embodiment, in the subframe, the synchronization signal is located in front of the OFDM symbol.

In an exemplary embodiment, the sum of lengths of the first CP, the second CP and the synchronization signal data portion is 160 Ts, or 144 Ts, or 512 Ts, where Ts=1/30.72 μs.

In an exemplary embodiment, the subframe further includes:

a first GP located in front of the synchronization signal, or a first GP located in front of the synchronization signal and a second GP located behind the synchronization signal.

In an exemplary embodiment, when the subframe further includes the first GP located in front of the synchronization signal, the sum of lengths of the first GP, the first CP, the second CP and the synchronization signal data portion is 160 Ts or 144 Ts or 512 Ts; and when the subframe further includes the first GP located in front of the synchronization signal and the second GP located behind the synchronization signal, the sum of lengths of the first GP, the second GP, the first CP, the second CP and the synchronization signal data portion is 160 Ts or 144 Ts or 512 Ts.

In an exemplary embodiment, the first GP and the second GP are used for uplink and downlink conversion time and/or prevention of interference between uplink and downlink signals.

Other implementation details may refer to the embodiment two.

An embodiment of the present disclosure also provides a radio frame structure. The radio frame structure may refer to the embodiment one.

An embodiment of the present disclosure also provides a computer-readable storage medium, which stores a computer-executable instruction. When the computer-executable instruction is executed by a processor, the above-mentioned synchronization signal transmission method in a communication system is implemented.

An embodiment of the present disclosure also provides a computer-readable storage medium, which stores a computer-executable instruction. When the computer-executable instruction is executed by a processor, the above-mentioned synchronization method in a communication system is implemented.

Those of ordinary skill in the art can understand that all or some of the steps in the above-mentioned methods may be completed by instructing relevant hardware via a program. The program may be stored in a computer-readable storage medium, such as a read-only memory, a magnetic disk or an optical disk or the like. In an exemplary embodiment, all or some of the steps in the above-mentioned embodiments may be implemented by using one or more integrated circuits. Accordingly, each module/unit in the above-mentioned embodiments may be implemented in a form of hardware, or may also be implemented in a form of software function module. The present application is not limited to the combination of hardware and software in any specific form.

Although the implementation mode disclosed in the present application is as above, the content is only the implementation mode adopted for convenience of understanding the present application, not intended to limit the present application. Any person skilled in the art may make any modifications and changes in an implementation form and details without departing from the rule and scope disclosed in the present application. However, the scope of patent protection of the present application must be subject to the scope defined by the appended claims.

INDUSTRIAL APPLICABILITY

In the transmission method provided by embodiments of the present disclosure, during transmission of synchronization signals may not occupy existing LTE resources, and a CP length of an OFDM symbol is shortened instead by utilizing the characteristic of small TP coverage range in a UDN, and remaining CP resources are used for the transmission of synchronization signals. By fully utilizing the CP of the LTE system to bear synchronization signals, the embodiments of the present disclosure not only save overheads and reduce interference between a synchronization signal and data, but also can ensure the backward compatibility of traditional terminals. The transmission method in the embodiments of the present disclosure is additionally characterized by bearing synchronization signals instead of information or modulated information in the CP. Because the content of the synchronization signal may be appointed or configured in advance, a receiving end has known the content of the synchronization signal transmitted by a transmitting end before receiving the synchronization signal, and may utilize the known synchronization signal to complete measurement of time offset or frequency offset or signal strength. This breaks a viewpoint in a traditional thinking where the receiving end does not know the content of information transmitted by the transmitting end before receiving a signal bearing information. In the synchronization method provided in the embodiments of the present disclosure, TP synchronization mute only occupies remaining CP resources, and does not use existing LTE resources, and subframe-level mute or special subframe mute is not needed. Therefore, in small stations synchronization processing can be performed, and data can also be transmitted to a terminal simultaneously, and the system throughput is not reduced, and the TP system efficiency is increased, and the problems in a TP synchronization manner (for example, CRS synchronization) in the related art, where a target cell cannot transmit data at a corresponding subframe and the system throughput is reduced due to the fact that subframe-level mute or special subframe mute is required for the target cell and a lower cell, are avoided.

What is claimed is:

1. A synchronization signal transmission method in a communication system, comprising:

generating, by a communication node, a radio frame; the radio frame comprising N subframes, each subframe comprising M Orthogonal Frequency Division Multiplexing, OFDM, symbols and P synchronization signals; each OFDM symbol comprising a first Cyclic Prefix, CP, and an OFDM symbol data portion, wherein data signals of the first CP are as same as data signals of a tail of the OFDM symbol data portion at a corresponding length; N, M and P are positive integers, and 0≤P≤M; and a synchronization signal comprises a second CP and a synchronization signal data portion; and transmitting, by the communication node, the radio frame, wherein the synchronization signals in the radio frame are used for other communication node in the communication system to perform a synchronization processing, wherein the subframe further comprises:
a Guard Period, GP; and
the GP comprises: a first GP located in front of the synchronization signal, or a first GP located in front of the synchronization signal and a second GP located behind the synchronization signal,
when the GP comprises the first GP located in front of the synchronization signal, a sum of lengths of the first GP, the first CP, the second CP, and the synchronization signal data portion is 160 Ts or 144 Ts or 512 Ts; and
when the GP comprises the first GP located in front of the synchronization signal and the second GP located behind the synchronization signal, a sum of lengths of the first GP, the second GP, the first CP, the second CP, and the synchronization signal data portion is 160 Ts or 144 Ts or 512 Ts;
wherein Ts is a time unit of an LTE time domain, and Ts=1/30.72 µs.

2. The method according to claim 1, wherein
the communication node comprises a Transmission Point, TP, and/or a terminal.

3. The method according to claim 1, wherein
a length of the radio frame is 10 ms, and a length of the subframe is 1 ms, and M= is equal to 14 or 12.

4. The method according to claim 1, wherein
data signals of the second CP are as same as data signals of a tail of the synchronization signal data portion at a corresponding length.

5. The method according to claim 1, wherein
in the subframe, the synchronization signal is located in front of the OFDM symbol.

6. The method according to claim 1, wherein
a sum of lengths of the first CP, the second CP, and the synchronization signal data portion is 160 Ts, or 144 Ts, or 512 Ts, wherein Ts is a time unit of an LTE time domain, and Ts=1/30.72 µs.

7. The method according to claim 1, wherein
the GP is used for uplink and downlink conversion time and/or prevention of interference between uplink and downlink signals.

8. A synchronization method in a communication system, comprising:
receiving, by a communication node, a radio frame; the radio frame comprising N subframes, each subframe comprising M Orthogonal Frequency Division Multiplexing, OFDM, symbols and P synchronization signals; each OFDM symbol comprising a first Cyclic Prefix, CP, and an OFDM symbol data portion, wherein data signals of the first CP are as same as data signals of a tail of the OFDM symbol data portion at a corresponding length; N, M and P are positive integers, and 0≤P≤M, and a synchronization signal comprises a second CP and a synchronization signal data portion; and
performing, by the communication node, a synchronization processing according to the synchronization signals in the radio frame,
wherein the performing, by the communication node, a synchronization processing according to the synchronization signals in the radio frame comprises:
aligning, by the communication node, CP headers of the OFDM symbols, deleting first CPs, and performing an OFDM data processing according to OFDM symbol data portions; and aligning CP headers of the synchronization signals, removing second CPs, and performing the synchronization processing according to synchronization signal data portions.

9. The method according to claim 8, wherein
the synchronization signal is located at a predetermined position in the subframe.

10. The method according to claim 9, wherein
when the communication node is one of Transmission Points, TPs, for hierarchical synchronization and a higher TP for the hierarchical synchronization transmits the synchronization signal, the communication node receives, when receiving a radio frame, the synchronization signal mutely at the predetermined position in each subframe of the radio frame.

11. The method according to claim 9, wherein
when the communication node is one of TPs for hierarchical synchronization and the synchronization signal is transmitted between other TPs for the hierarchical synchronization, the communication node is, when receiving a radio frame, muted at the predetermined position in each subframe of the radio frame.

12. A synchronization device in a communication system, arranged in a communication node, comprising:
a receiving module, configured to receive a radio frame, the radio frame comprising N subframes, each subframe comprising M Orthogonal Frequency Division Multiplexing, OFDM, symbols and P synchronization signals, each OFDM symbol comprising a first Cyclic Prefix, CP, and an OFDM symbol data portion, wherein data signals of the first CP are as same as data signals of a tail of the OFDM symbol data portion at a corresponding length; N, M and P are positive integers, and 0≤P≤M, and a synchronization signal comprises a second CP and a synchronization signal data portion; and
a processing module, configured to perform a synchronization processing according to the synchronization signals in the radio frame,
wherein the processing module is configured to align CP headers of the OFDM symbols, delete first CPs, and perform an OFDM data processing according to OFDM symbol data portions; and align CP headers of the synchronization signals, remove second CPs, and perform the synchronization processing according to synchronization signal data portions.

13. The device according to claim 12, wherein
the synchronization signal is located at a predetermined position in the subframe.

14. The device according to claim 13, wherein
when the communication node is one of Transmission Points, TPs, for hierarchical synchronization and a higher TP for the hierarchical synchronization transmits the synchronization signal, the receiving module is configured to receive, when receiving a radio frame, the synchronization signal mutely at the predetermined position in each subframe of the radio frame.

15. The device according to claim 13, wherein
when the communication node is one of TPs for hierarchical synchronization and the synchronization signal is transmitted between other TPs for the hierarchical synchronization, the receiving module is configured to be, when receiving a radio frame, muted at the predetermined position in each subframe of the radio frame.

* * * * *